United States Patent [19]
Chu

[11] Patent Number: 5,570,735
[45] Date of Patent: Nov. 5, 1996

[54] MULTI-FUNCTIONAL PLASTIC AUTOMOBILE SHADE

[75] Inventor: Lawrence H. Y. Chu, Lewisville, Tex.

[73] Assignee: Merryland Products, Inc., Lewisville, Tex.

[21] Appl. No.: 444,401

[22] Filed: May 19, 1995

[51] Int. Cl.⁶ ........................................................ B60J 3/00
[52] U.S. Cl. ........................ 160/370.23; 160/135
[58] Field of Search ................ 160/370.21, 370.23, 160/368.1, 354, 405, DIG. 2, DIG. 3; 296/95.1, 96, 97.1, 97.3, 97.7, 97.8, 97.9

[56] References Cited

U.S. PATENT DOCUMENTS

| | | | |
|---|---|---|---|
| 2,646,118 | 7/1953 | Berty | 160/369 |
| 2,944,601 | 7/1960 | Compson | 160/370.21 |
| 3,279,845 | 10/1966 | Lutz | 160/370.23 X |
| 3,913,656 | 10/1975 | Guyer | 160/135 |
| 4,109,957 | 8/1978 | Polizzi et al. | 296/95 |
| 4,202,396 | 5/1980 | Levy | 160/107 |
| 4,372,086 | 2/1983 | Hanlon | 160/135 |
| 4,597,608 | 7/1986 | Duffy | 296/95 |
| 4,635,993 | 1/1987 | Hooper et al. | 296/95 |
| 4,671,334 | 6/1987 | Yadegar et al. | 160/84 |
| 4,848,825 | 7/1989 | Nierberger | 296/95.1 |
| 4,861,090 | 8/1989 | Gavrieli | 160/134 |
| 4,877,074 | 10/1989 | Castellano | 160/84 |
| 4,878,708 | 11/1989 | Champane | 296/97.7 |
| 4,886,104 | 12/1989 | Eldrige | 160/370.2 |
| 4,947,920 | 8/1990 | Moll | 160/84.1 |
| 5,004,285 | 4/1991 | Bennett | 296/1.1 |
| 5,035,460 | 7/1991 | Huang | 296/95.1 |
| 5,046,543 | 9/1991 | Levy | 160/84.1 |
| 5,267,599 | 12/1993 | Kim | 160/370.2 |
| 5,324,090 | 6/1994 | Lehnhoff | 160/370.21 X |

Primary Examiner—David M. Purol
Attorney, Agent, or Firm—Ladas & Parry

[57] ABSTRACT

A multi-functional plastic board is adopted to be attached to inside or outside of an automobile. The shade comprises a single piece of board with four folding panels. The board is a rigid, lightweight and durable corrugated plastic board which has smooth surfaces on both sides of the board and fine channels therebetween. The four panels are divided by three cutting lines, while adjacent ones of the panels are connected with integral portions therebetween. Each of the cutting lines are divided by the integral portions into segments. Two scoring lines are formed near each of the integral portions on respective adjacent panels so that the panels can be folded along the cutting lines. A plurality of holes are provided respectively at each corner of the board and the panels. Ropes with steel wire core are provided for attaching the shade to inside or outside of the automobile in association with the holes.

7 Claims, 10 Drawing Sheets

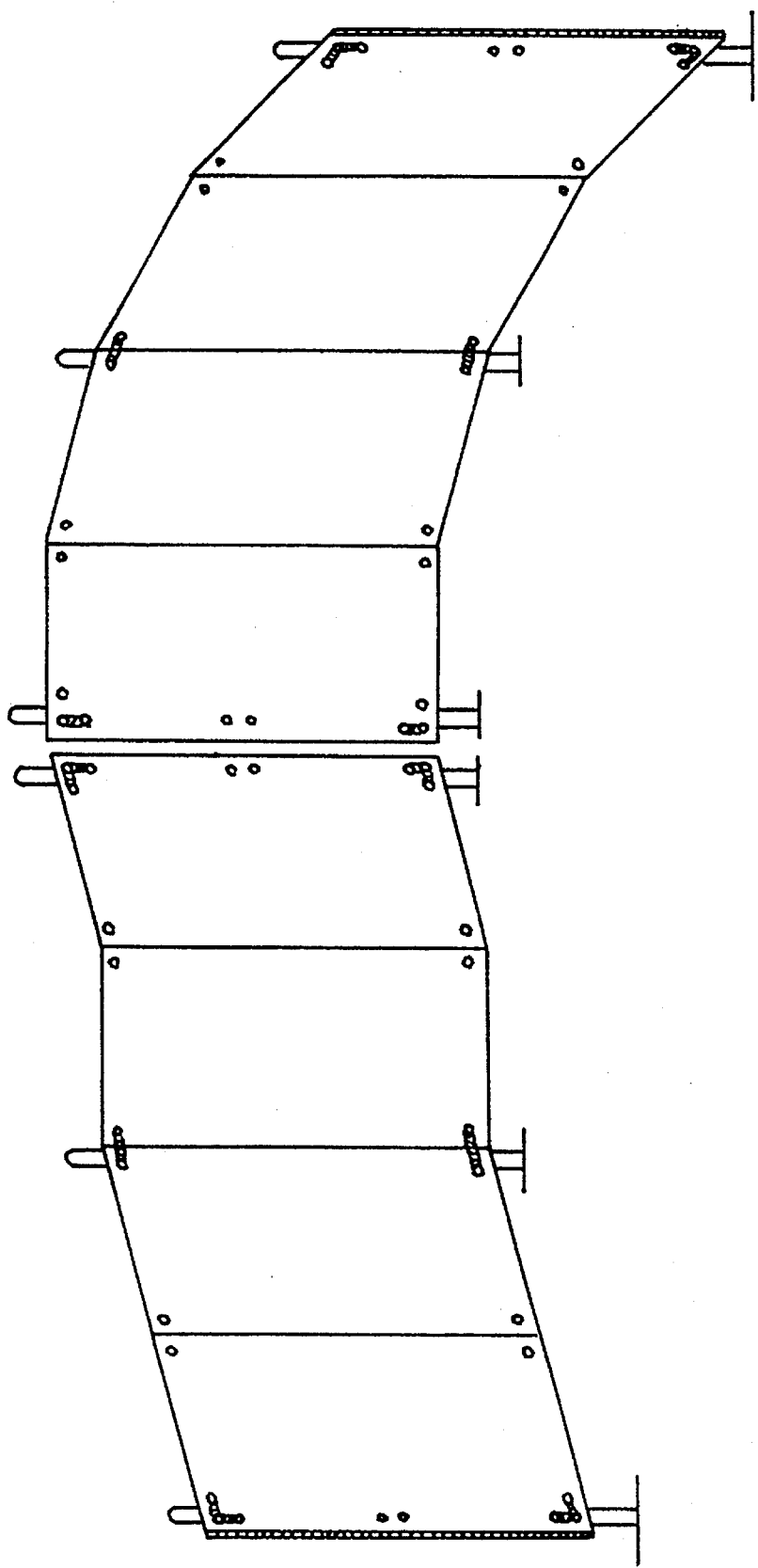

MULTI-FUNCTIONAL PLASTIC AUTOMOBILE SHADE

The present invention relates to a multi-functional plastic automobile shade which has a variety of alternative applications, such as beach sun shells or tent, sunbathing pads, compost or garbage stands, greeting or display boards, and wall construction members. Particularly, this invention relates to a multi-functional plastic automobile shade made of a single corrugated plastic board which is rigid, lightweight, durable, and waterproof.

BACKGROUND OF THE INVENTION

There are many kinds of automobile or vehicle window shades or cover, such as rolling sheets, venetian blinds, pleated panels, and folding fans. They are made of cardboard, flexible plastic sheet, or other suitable materials. They are used inside or outside of cars. For example, U.S. Pat. No. 4,848,825 discloses a windshield cover to be used outside of cars. The cover is made of semi-rigid corrugated cardboard with waterproof coatings. U.S. Pat. No. 5,035,460 shows a flexible windshield cover for outside use. A shade used outside of a car is usually attached to the car by means of ropes, belts or extended portions thereof being clamped by the doors, such as U.S. Pat. Nos. 5,035,460; 4,848,825; 4,597,608; 4,635,993; and 2,646,118.

For inside use, a shade is usually in the forms of venetian blinds, plural collapsible and pleated panels, folding fans, or flexible sheet, for instance, U.S. Pat. Nos. 4,877,074; 4,202,396; 4,671,334; 4,947,920; 4,886,104; 5,004,285; 4,109,957; and 4,861,090. A shade used inside of a car usually has certain cutout portions for accomplishing the rear-view mirror and the profile of the windshield, such as the one in U.S. Pat. No. 4,202,396; 4,947,920; and 4,877,074.

U.S. Pat. Nos. 5,046,543 and 5,267,599 teach respectively alternative applications of the shade as poster or sunbathing mat. The shade used as poster has hand holding cutouts and a cutout for rear-view mirror. The rear-view mirror cutout substantially destroys the integrity of the poster. The shade used as sunbathing mat includes a plurality of layers of flexible sheets and rigid layers disposed therein. Such a laminated structure has relatively high manufacturing cost and is not durable.

For folding panels, the cardboard is usually preferred material. It can be folded by providing v-shaped or U-shaped grooves between panels because the cardboard is semi-rigid, e.g. U.S. Pat. Nos. 4,878,708 and 4,671,334. U.S. Pat. No. 4,878,074 discloses a hinge arrangement of a series of perforations for folding semi-rigid cardboard. It also discusses other hinge arrangements, such as, flexible connecting strips and yieldable materials being adhered or stapled to the panels. It is generally recognized that the rigid panels can only be connected by hinge arrangement of flexible and yieldable materials. Thus, the manufacture cost is relatively high because of the complicated hinge structures.

The shades in the prior art have respectively disadvantages. Cardboard shades are of low manufacturing cost, but easy to be torn and not waterproof. A plurality of collapsible and pleated panels are generally used inside of cars. They may have better heat insulating effect, but have higher manufacturing cost. Rigid folding panels cannot be well fitted inside the car, nor be easily folded with simple connecting structure.

SUMMARY OF THE INVENTION

The object of the present invention is to provide a multi-functional plastic automobile shade to be used in various alternative applications, such as compost stand, beach pad, beach sun shell or tent, and display board.

Another object of the present invention is to provide an automobile shade which can be used inside and outside of the car so that it can reduce effectively sun radiation heat and protect particularly windshield from snow and ice. The shade of this invention can be used at any side of a vehicle to cover the side at which that the sunlight directly radiates so as to obtain better shading effect.

The other object of this invention is to provide a multi-functional automobile shade which is durable and lightweight and has lower manufacture cost, while the shade has better heat shielding result than normal solid panels.

According to the present invention, a multi-functional plastic automobile shade is used inside or outside of an automobile. The shade comprises a single piece of board with four folding panels, said board being a rigid, lightweight and durable corrugated plastic board having smooth surfaces on both sides of the board and fine channels therebetween, said four panels being divided by three cutting lines, while adjacent ones of said panels are connected with integral portions therebetween, each of said cutting lines divided by said integral portions into segments, two scoring lines formed near each of said integral portions on respective adjacent panels so that the panels can be folded along the cutting lines, a plurality of holes provided respectively at each corner of the board and the panels, and means for attaching the shade to inside or outside of the automobile in association with said holes.

The plastic corrugated board used in this invention has a sandwich structure. Although the individual plastic sheets are semi-rigid, the board formed thereof is generally rigid because the board is relatively thick. A person usually can hardly imagine how such a rigid board can be folded without any flexible structure between folding panels, especially along a line that is transverse to the longitudinal direction of the corrugated channels.

According to the present invention, a method of manufacturing a multi-functional plastic automobile shade comprises the steps of preparing a piece of corrugated plastic board with smooth surfaces on both sides and fine channels therebetween, cutting the corrugated board into four panels to obtain three cutting lines therebetween, while leaving integral portions for connecting respectively two adjacent ones of said panels, forming scoring lines near the integral portions on respective adjacent said panels, and punching a plurality of holes respectively at each corner of the board and the panels.

When the shade is used inside of a car, one of the panels can be folded over to reduce the size of the board so that the shade can be placed on the dashboard of the car. When the shade is used outside of the car, all of the panels are spread out so that the shade can cover more areas of the exterior of the car. The shade can be placed at any side of the car.

The shade can be folded to constitute a compost stand or to form a sun shell or tent because of its durable and waterproof properties. Other applications and advantages of the board can be understood from the detailed description of this invention with reference to the accompanying drawings.

BRIEF DESCRIPTION OF THE DRAWINGS

FIGS. 9–11 illustrate respectively alternative applications of the automobile shade of this invention as a greeting board, a tent, a sunbathing pad, and wall construction members.

DETAILED DESCRIPTION OF THE INVENTION

Figure 1:
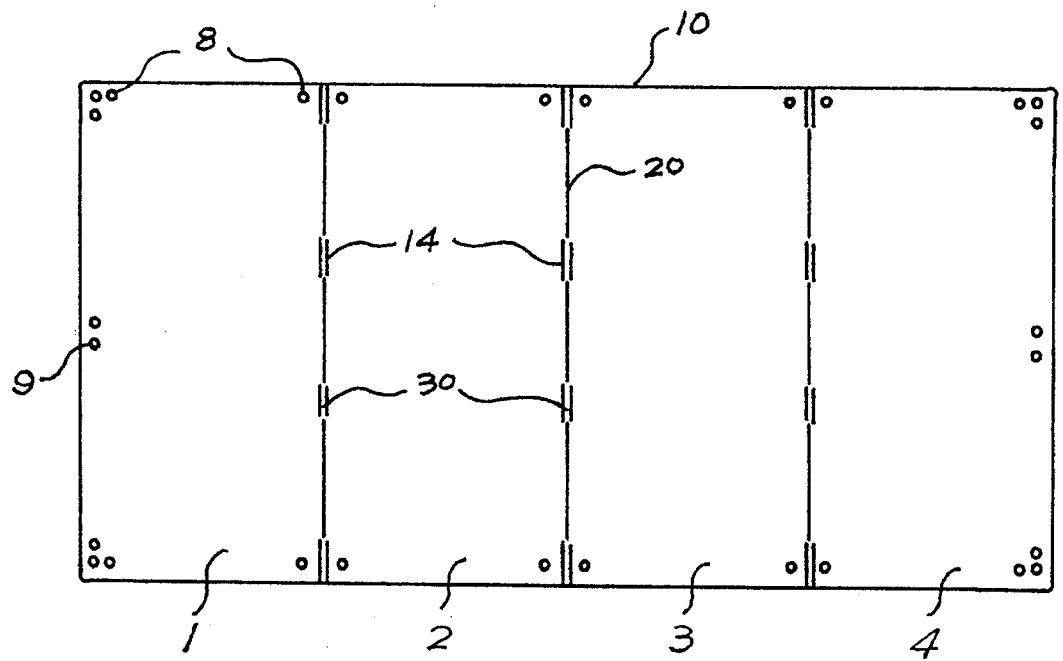
FIG. 1 is a plane view of the multi-functional plastic automobile shade of this invention.

With reference to FIG. 1, the shade 10 comprises four panels 1–4 having cutting lines 20 formed therebetween. On each cutting line, there are three or four integral portions 30 connecting the adjacent panels. Near each integral portion, there are two scoring lines 14 for purpose of folding the panels along the cutting lines. Holes 8 are formed in each corner of the shade as well as in each corner of the respective panels. Holes 9 are punched at intermediate locations respectively at two opposite ends of the shade. Preferably, two holes form a pair and they are close to each other. Hence, any rope threaded over the holes may be held relatively tight in comparison with holes spaced apart.

Figure 2A:
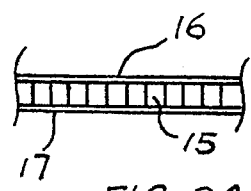
FIG. 2A is a partial view of the shade, illustrating the corrugated board structure of the invention.
Figure 2:
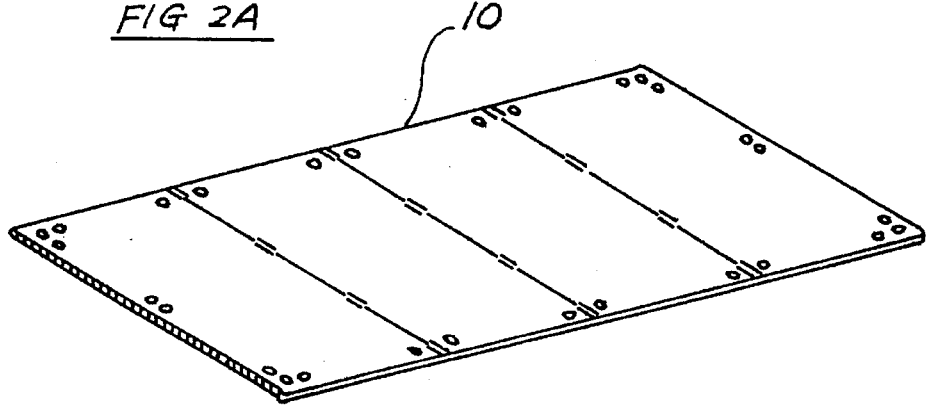
FIG. 2 is a prospective view of the multi-functional shade of this invention.
Figure 3:
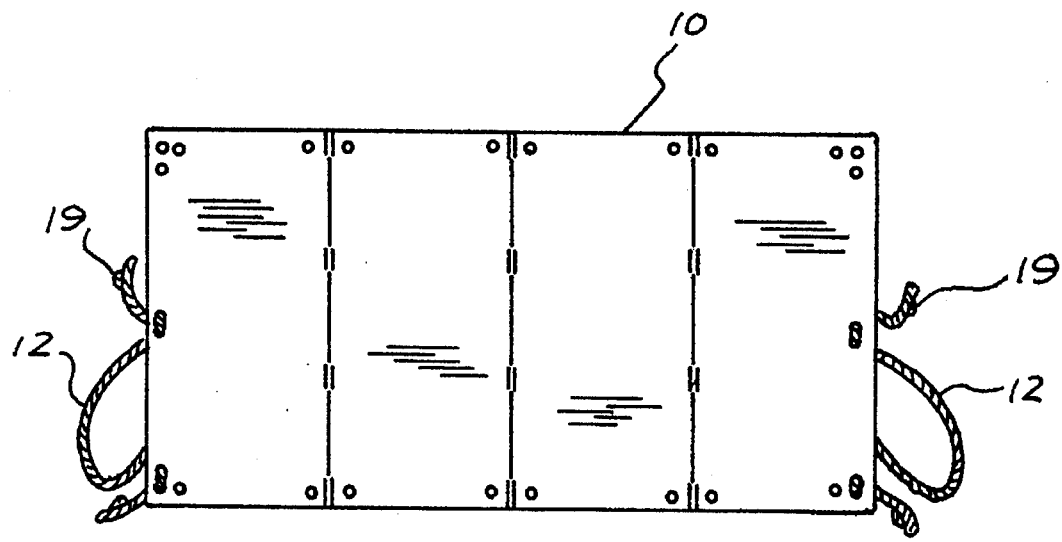
FIG. 3 shows the shade of this invention with the connection of ropes for attaching the shade to the windshield of the automobile.
Figure 3A:
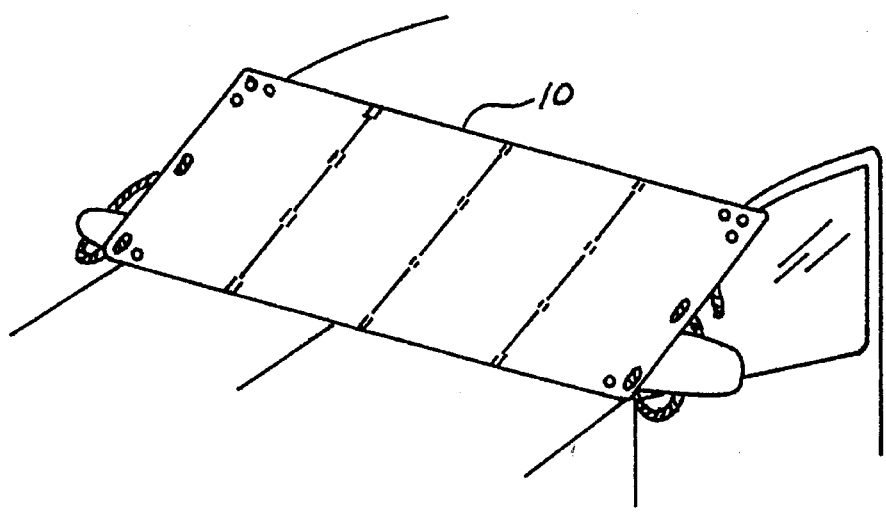
FIGS. 3A–3C show the attachment of the shade of the present invention on the windshield of the automobile.
Figure 3B:
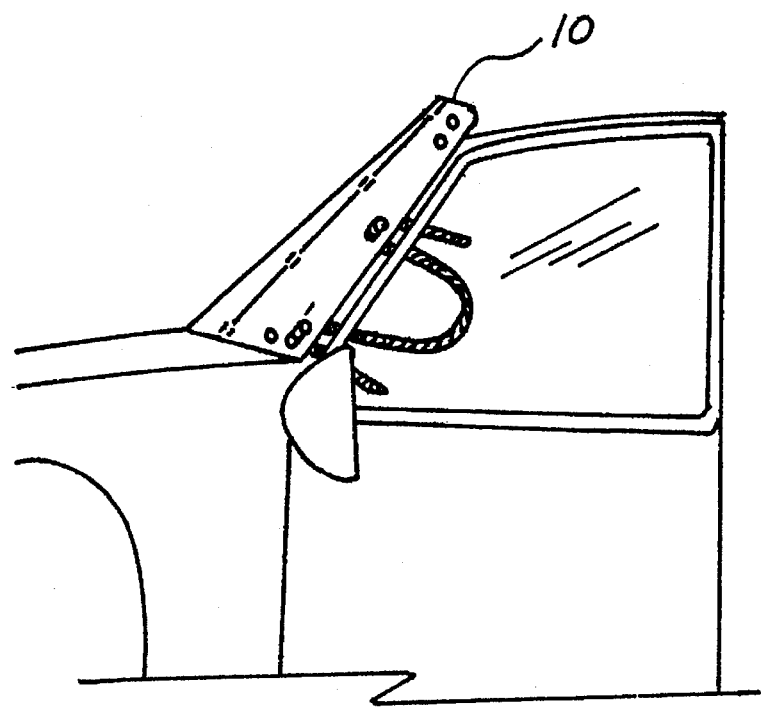
Figure 3C:
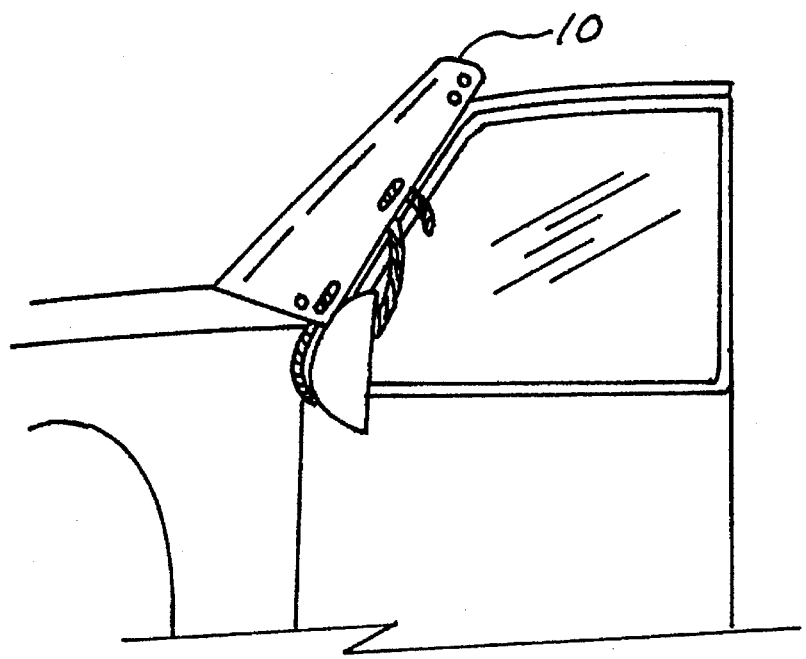

The shade is made of a single piece of rigid and durable corrugated plastic board. The corrugated plastic board has smooth surfaces 16 and 17 at both sides and a plurality of flutes or fine channels 15 formed between the two surfaces, as illustrated in FIG. 2A. Preferably, the cutting lines 20 are formed transversely with respect to the longitudinal direction of the board or the direction of the channels. Each cutting line is divided by the integral portions 30 into two or three segments.

The corrugated board used for this invention is rigid, durable, lightweight, waterproof, and resists to most of commonly used chemicals. Conventionally, one would think that the rigid corrugated plastic board cannot be bent or folded. As discussed above, the way to connect the rigid panels is to provide flexible or yieldable materials between the panels. It would be costly to provide flexible folding portions between the panels. Thus, the present invention provides cutting lines 20 and the scoring lines 14 which are simultaneously or subsequently punched on the single piece of the board. The cutting lines 20 cut through the board, while the scoring lines 14 are shallow depressions on the board. Therefore, without high manufacturing cost, the rigid board is divided into four folding panels. The folded shade can then be easily stored and transported.

An automobile shade is a kind of inexpensive product. Thus, the manufacturing cost is critical. An inexpensive product with several functions will bring about further advantages of substituting many other goods. Then, the cost will be considerably reduced.

FIGS. 3 and 3A–3C illustrate the application of the shade of this invention outside of the windshield of the automobile vehicle. When the shade is used to cover the outside of the windshield of the car, ropes 12, as particularly shown in FIG. 8, can be threaded into the holes 8 and 9 at the ends and the middle of the shade. The loop formed by the rope 12 can be hooked on the side mirrors. The rope 12 can then be pulled and clamped by the car doors. To prevent the shade to be stolen, a node 19 can be made on each rope close to the holes on the board. Alternatively, each rope may be tied to any part inside of the car.

Figure 4:
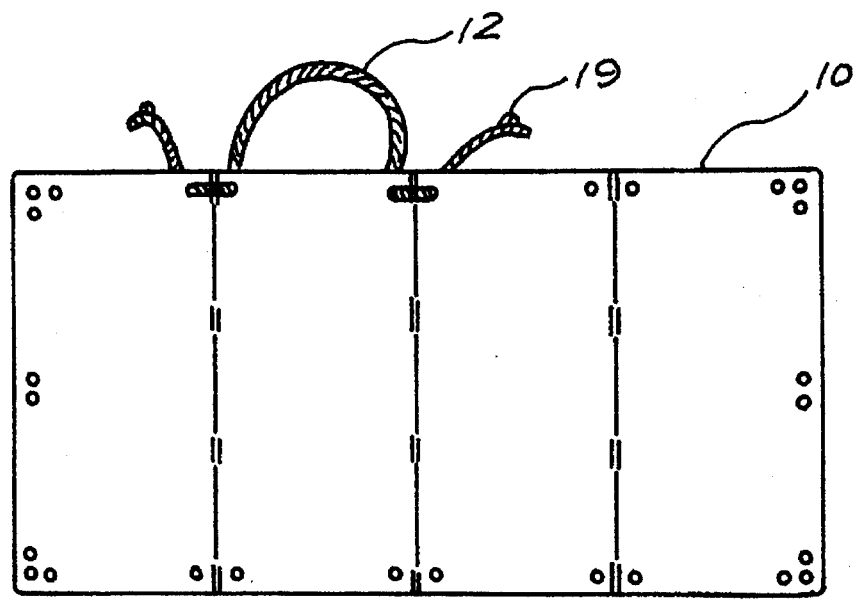
FIG. 4 is the connection of the ropes for attaching the shade of this invention to the side of the automobile.
Figure 4A:
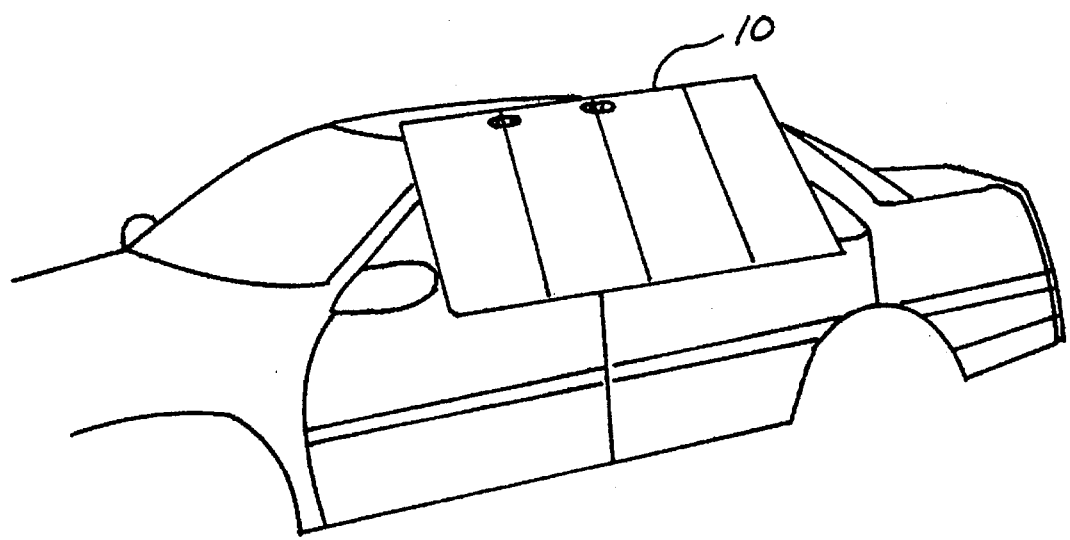
FIGS. 4A and 4B show the attachment of the present invention on the side of the automobile.
Figure 4B:
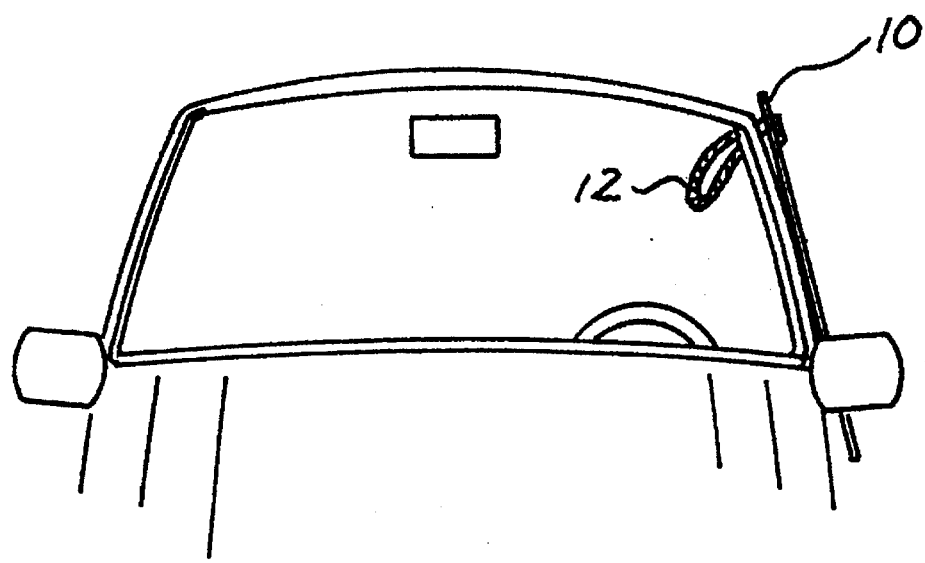

In FIGS. 4, 4A and 4B, the rope 12 are threaded in the holes 8 in the corners near the cutting lines or integral portions between the panels and leaves large portions of the rope to be clamped through the top of the car door. Thus, the shade can be attached to either side of the automobile. Certainly, the connection of the rope 12 can be made in accordance with the different size of the car or any appropriate locations or positions.

Figure 5:
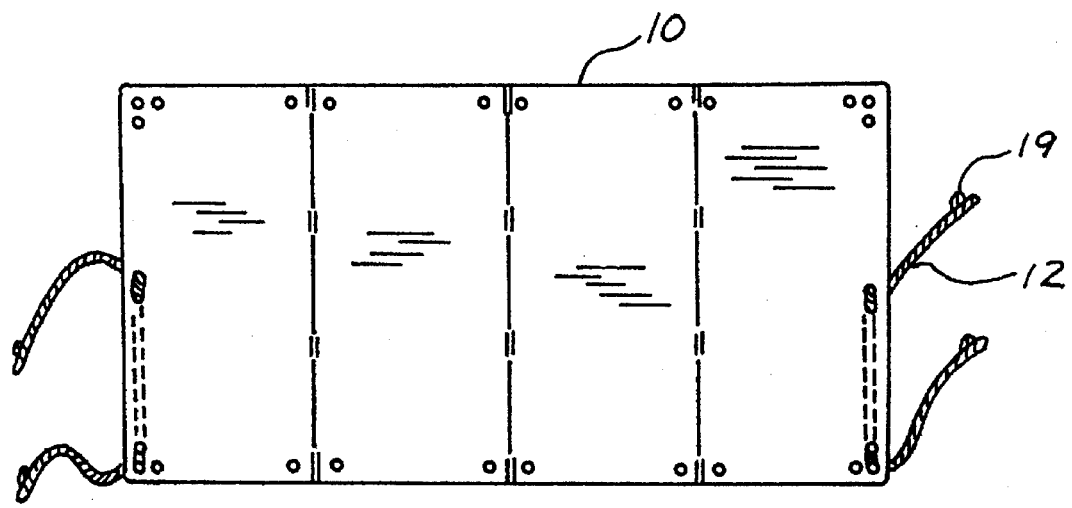
FIG. 5 is the connection of the ropes for attaching the shade on the rear window of the automobile.
Figure 5A:
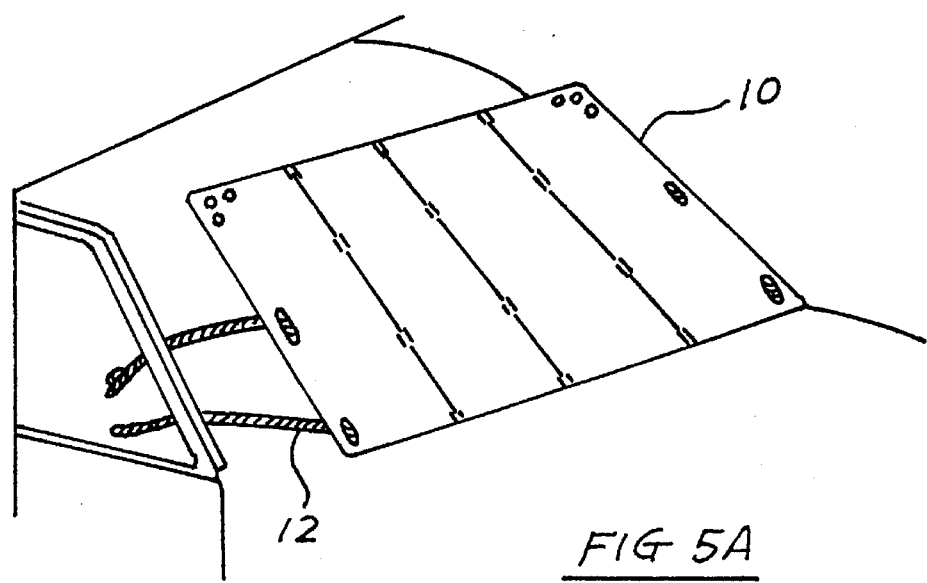
FIG. 5A illustrates the shade of this invention being attached to the rear window of the automobile.
Figure 6:
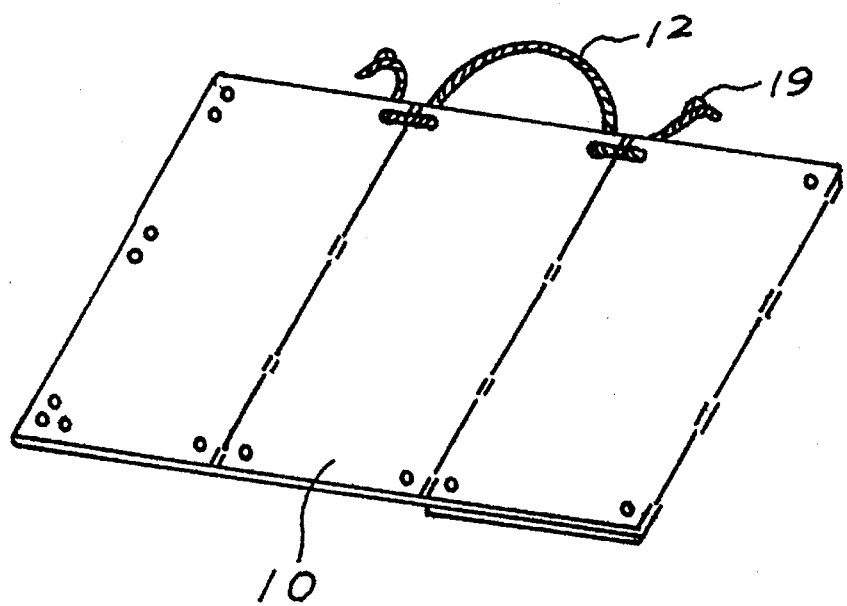
FIG. 6 illustrates the connection of the ropes for attaching the shade of the present invention inside of the automobile.
Figure 6A:
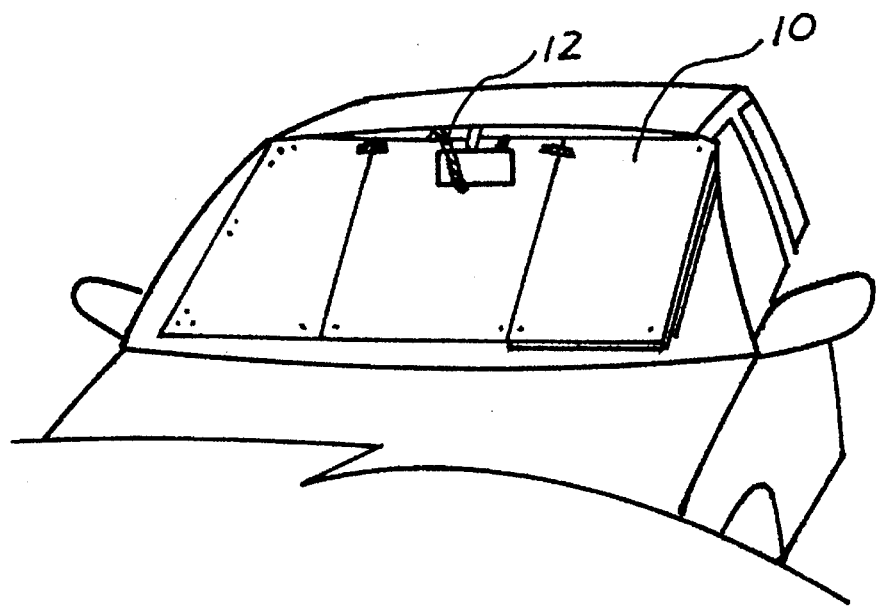
FIGS. 6A and 6B show the placement of the shade of this invention on the dashboard of the automobile.
Figure 6B:
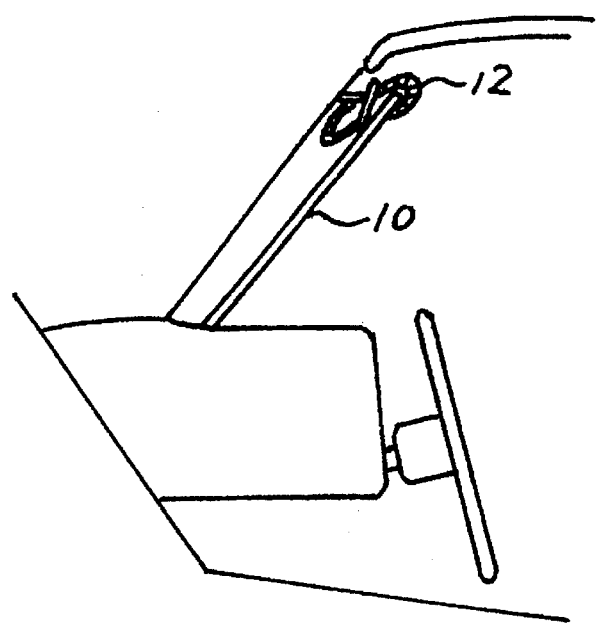

FIGS. 5 and 5A illustrate the attachment of the shade on the rear window of the car. The ropes are clamped by the rear doors of the car. FIGS. 6, 6A and 6B show the placement and attachment of the shade inside or on the dashboard of the car. The rope 12 is hooked on the rear-view mirror. The shade has one panel folded over to reduce the size of the shade.

Figure 8:
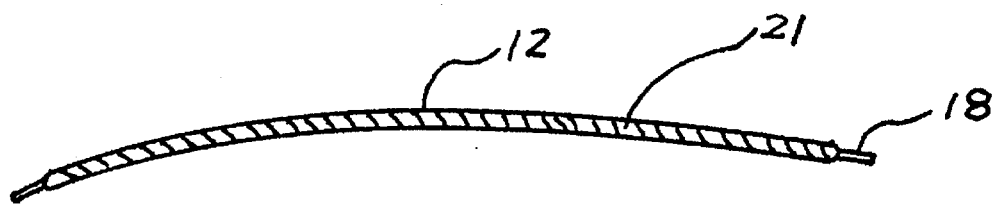
FIG. 8 shows the rope or cord used for the attachment of the multi-functional shade of the present invention.

It can be understood that to tie the rope with a part of the car can better prevent the shade from being easily removed or stolen. To prevent the rope from being easily cut, the rope includes a steel wire core 18 within the fabric coating 21 as shown in FIG. 8.

On the other hand, the holes 8 and 9 are of size that is bigger than the steel wire core 18 but smaller than the outer diameter of the rope. In that way, the rope 12 will be tightly held in the hole. Once the rope is clamped by the door, it cannot be easily pulled out. Any other suitable strong ropes can be used in place of the particular rope disclosed herein.

The heat shielding or insulation effect of the shade placed outside of the car is generally better than that of the shade placed inside the car. The channels or flutes of the corrugated board can further improve the heat insulation effect because the air passing through the channels may cool the shade. Moreover, the board placed outside the car may also protect the car windows from snow, fogging and icing. After snowing or icing rain, one can simply remove the board to clean up the windshield, thereby to avoid the time consuming work of sweeping or scratching the windshield.

The conventional shade of either flexible sheets or non-waterproof cardboard cannot have the good result as does the present invention for the outdoor use. None of the conventional shades are as strong and durable as the present invention. Yet, the present invention is easy to be manufactured and has considerably lower cost than other automobile covers or shade.

Figure 7:
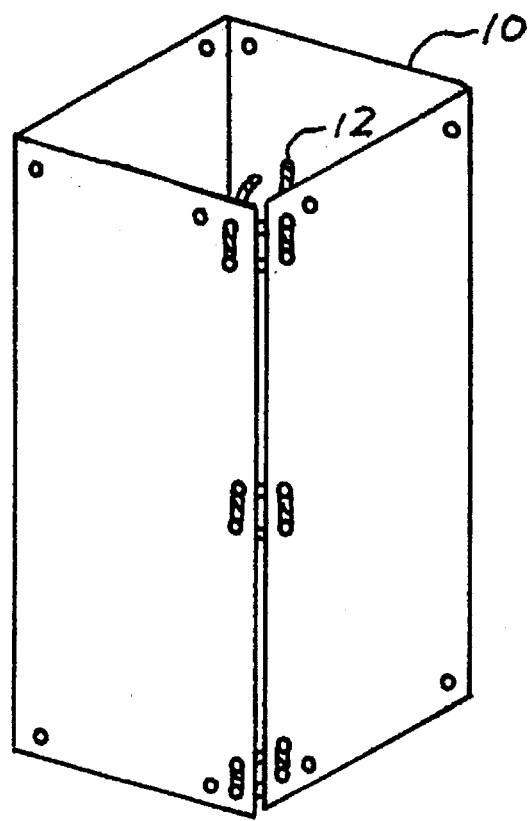
FIG. 7 illustrates the use of the present invention as a compost or garbage stand.

An alternative use of the shade of this invention can be seen in FIG. 7. The compost stands shown in FIG. 7 may either stand by itself when the board is so folded or reinforced by the rope or ropes passing through the holes. Particularly, such a durable plastic stand may stretch a plastic bag therein for storage or for compost of falling leaves as now required by environmental laws. Certainly, the shade of plastic board can construct a garbage stand, especially for picnic use.

Figure 10:
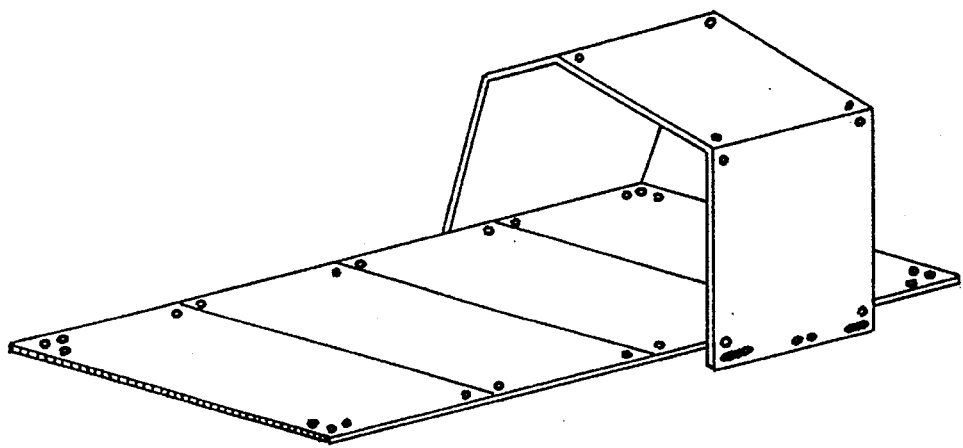

The shade can be folded into a small tent or shell. The tent or shell can stand itself. However, the ropes can be used to fix the shell or tent to the ground or other objects. The shade can be fully spread for a person lying thereon. Particularly, the durable plastic board may provide a smooth surface on beach sand, while another board of this invention can be used to construct a tent over the pad as shown in FIG. 10.

Figure 9:
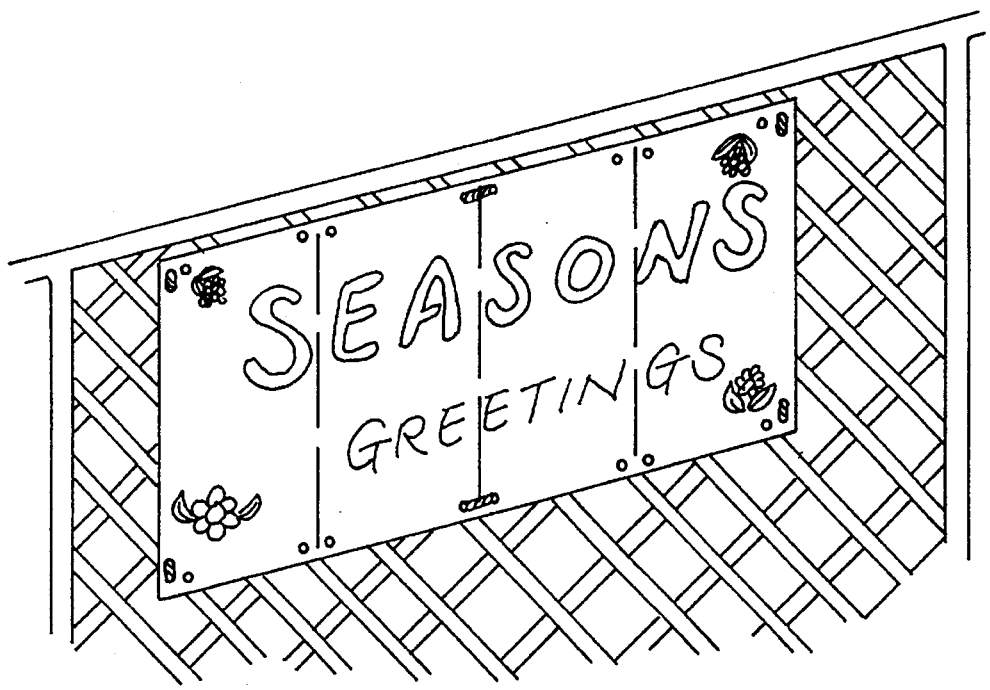

Any picture can be printed on the smooth surfaces of the board functioning as greeting or display board as illustrated in FIG. 9. Because of the durable and all weather proof, such greeting board can be used outdoor in any season for relative longer time than a display board of cardboard or other materials. Again, it is easy for use and storage. A plurality of shades can even construct a section of wall or barrier by properly application of ropes through the holes to tie them together or tie them on posts or other fixtures as illustrated in FIG. 11.

It can be understood that the appropriate locations of holes have significate meanings for this multi-functional shade. The preferred locations are shown in FIG. 1. At each corner of the shade, there are three holes forming a triangle. Two holes 9 are provided in the middle of each end of the shade. Nevertheless, various combinations of holes can be adopted in accordance with particular needs and size of the vehicle.

I claim:

1. A multi-functional plastic automobile shade adopted to be attached to inside or outside of an automobile, comprising a single piece of board with four folding panels, said board being a rigid, lightweight and durable corrugated plastic board having smooth surfaces on both sides of the board and fine channels therebetween, said four panels being divided by three cutting lines, while adjacent ones of said panels are connected with integral portions therebetween, each of said cutting lines divided by said integral portions into segments, two scoring lines formed near each of said integral portions on the respective adjacent panels so that the panels can be folded along the cutting lines, a plurality of holes provided respectively at each corner of the board and the panels, and means for attaching the shade to inside or outside of the automobile in association with said holes.

2. The shade of claim 1, wherein three of said holes are provided at each corner of the shade to form a triangle and one of said holes at each corner of each of said panels is provided near the integral portion on the cutting line.

3. The shade of claim 1, wherein there are four integral portions dividing each of said cutting lines into three segments.

4. The shade of claim 1, wherein said attaching means are a plurality of ropes passing through said holes.

5. The shade of claim 4, wherein each said rope includes a fabric coating and a steel wire core.

6. The shade of claim 4 for use as a compost or garbage stand, wherein said panels are folded to form a quadrilateral column, said ropes used to secure the closing ends of the folded shade.

7. A method of manufacturing a multi-functional plastic automobile shade comprising the steps of preparing a piece of corrugated plastic board with smooth surfaces on both sides and fine channels therebetween, cutting the corrugated board into four panels to obtain three cutting lines therebetween, while leaving integral portions for connecting two adjacent ones of said panels, forming scoring lines near the integral portions on respective adjacent panels, and punching a plurality of holes respectively at each corner of the board and the panels.

* * * * *